(12) United States Patent
Noh et al.

(10) Patent No.: US 9,169,785 B2
(45) Date of Patent: Oct. 27, 2015

(54) AIR CUTOFF VALVE AND RESTART STABILIZATION METHOD USING THE SAME

(71) Applicant: DH HOLDINGS CO., LTD., Ulsan (KR)

(72) Inventors: Jong-Sang Noh, Ulsan (KR); Eul-Ho Son, Yangsan-si (KR); Jun-Hong Park, Busan (KR)

(73) Assignee: DH HOLDINGS CO., LTD., Ulsan (KR)

( * ) Notice: Subject to any disclaimer, the term of this patent is extended or adjusted under 35 U.S.C. 154(b) by 598 days.

(21) Appl. No.: 13/662,705

(22) Filed: Oct. 29, 2012

(65) Prior Publication Data

US 2013/0104844 A1    May 2, 2013

(30) Foreign Application Priority Data

Nov. 1, 2011  (KR) .................. 10-2011-0112838

(51) Int. Cl.
| | |
|---|---|
| *F02D 9/10* | (2006.01) |
| *F02D 41/04* | (2006.01) |
| *F02D 11/10* | (2006.01) |
| *F02D 41/00* | (2006.01) |

(52) U.S. Cl.
CPC ........ *F02D 9/10* (2013.01); *F02D 9/108* (2013.01); *F02D 9/1065* (2013.01); *F02D 11/106* (2013.01); *F02D 41/0005* (2013.01); *F02D 41/042* (2013.01); *Y02T 10/42* (2013.01)

(58) Field of Classification Search
CPC ....... F02D 9/10; F02D 9/108; F02D 41/0005; F02D 11/106; F02D 9/1065; F02D 41/042; Y02T 10/42

See application file for complete search history.

(56) References Cited

U.S. PATENT DOCUMENTS 3,724,822 A * 4/1973 Nambu et al. ................. 123/445

FOREIGN PATENT DOCUMENTS

| | | |
|---|---|---|
| CN | 1190712 A | 8/1998 |
| CN | 201162574 Y | 12/2008 |
| DE | 100 44 294 A1 | 5/2002 |
| DE | 10 2004 013 000 A1 | 10/2004 |
| EP | 628711 A1 * 12/1994 | ............ F02D 9/02 |
| JP | 2009-162073 A | 7/2009 |

OTHER PUBLICATIONS

German Office Action for German Patent Application No. 102012110422.0 which corresponds to the above-identified U.S. application.

* cited by examiner

*Primary Examiner* — Hieut Vo
(74) *Attorney, Agent, or Firm* — LRK Patent Law Firm

(57) ABSTRACT

An air cutoff valve (ACV) is provided. The full open state of the flap valve is maintained using the latchet which operates as the solenoid is turned on and off, so the restart performance is significantly enhanced as the air is quickly supplied by the ACV when the engine stops abnormally irrespective of a driver's intention, and since the ACV is made from a plastic material, the assembling process of the molding formation is simplified, so the unit cost for manufactures is reduced, and the corrosion phenomenon due to moisture can be prevented, and the operation reliability can be enhanced.

18 Claims, 11 Drawing Sheets

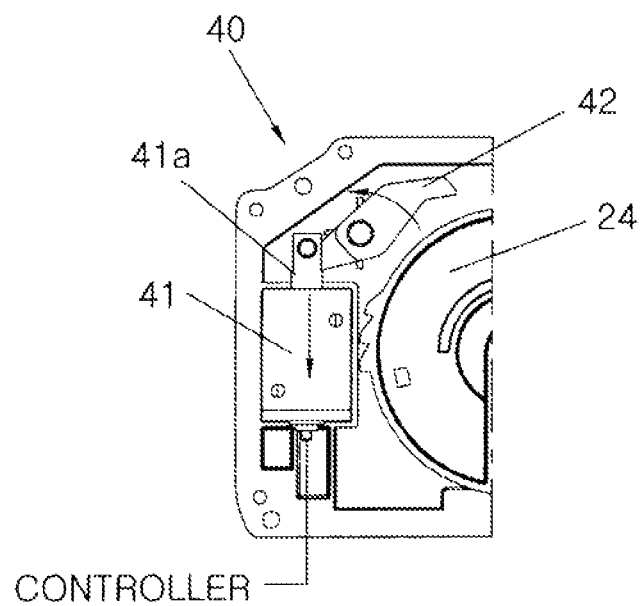

AIR CUTOFF VALVE AND RESTART STABILIZATION METHOD USING THE SAME

CROSS-REFERENCE TO RELATED APPLICATIONS

This application claims priority to Korean Patent Application No. 10-2011-0112838, filed on Nov. 1, 2011, which is incorporated herein by reference in its entirety.

BACKGROUND OF THE INVENTION

1. Field of the Invention

The present invention relates to an air cutoff valve, and in particular to an air cutoff valve and a restart stabilization method using the same which provide a quick restart by maintaining an open state of a flap valve for the sake of an air supply even when an engine stops unintentionally, and which provide a reduced number of molding processes and an enhanced productivity along with a reduced manufacture cost in such a way to apply a plastic material to elements.

2. Description of Related Art

A fuel cell vehicle necessitates air for the sake of a hydrogen reaction in a fuel cell stack, and the amount of air needed for a hydrogen reaction should be controlled.

A motored blower is generally used so as to suck and supply air, and an ACV (Air Cutoff Valve) is used for controlling the flow rate of air.

FIG. 9 is a view illustrating an air system line of a conventional fuel cell vehicle.

As shown therein, the air system line is connected with an inlet line 300 by way of which the sucked air flows to a fuel cell stack 200. An outlet line 40 is connected to the air system line for the air to discharge. A humidifier 500 is installed at the inlet line 300 and the outlet line 400 for the purpose of humidifying the air.

The blower 60 is installed at the inlet line 300 at the rear end of a filter 610 configured to filter the sucked air. The ACV 70 is installed at not less than one portion of the inlet line 300 and the outlet line 400 to make sure that the durability of the fuel cell stack 200 can be protected.

As described above, the ACV 700 is a member for the purpose of adjusting the air flow rate during the hydrogen reaction and comprises a housing body 701 with a certain air passage for the sake of air flow, a motor 710 having a driver generating a driving force in response to a control signal from a controller, a flap valve 720 configured to vary the opening degree with respect to an air passage of the housing body 701 using the flap body 722 rotating together with a rotary shaft 721 while the motor 710 is driving, and an electronic valve 730 controlling the motions of the flap valve 720 as it receives a rotational force from the motor 710.

The vehicle might stop as a driver keys off the engine under a normal situation that the driver intended or it starts as the driver keys on the engine or the vehicle might stop as the engine stops unintentionally in an abnormal situation. When the engine stops in an abnormal situation, a quick restart enhances the restart operation, thus enhancing the quality and reliability of a product.

Since the restart of an engine necessitates an air supply by way of the ACV 700 like when the vehicle first starts, the ACV 700 supplying the air is the most basic factor determining an engine start condition in terms of the engine start stability of the fuel cell vehicle.

The above explained ACV 700 is weak in terms of the restart performance of an engine.

The above mentioned problem is thanks to the operation type of the ACV 700. The ACV 700 operates in such a way that the flap valve 720 is switched to the full close state irrespective of the normal or abnormal operation when the engine is in a key off state, whereas the flap valve 720 is switched to the full open state in case of the key on.

Even though the engine stops, which is not a driver's intention, the operation state of the ACV 700 switches in a sequence of "the full open→full close", the procedure of which represents that even though the driver quickly restarts the engine, it switches in a sequence of "the full close→full open" like the first engine start situation.

The ACV 700, which does not have a good response performance to a driver's quick restart demand, makes impossible a quick restart, so the vehicle stopped due to the unexpected engine stop cannot be quickly moved. The driver might have an increasing worry. In worse case, the reliability of the vehicle becomes bad.

The ACV 700 comprises an integrated housing body 701 configured to accommodate the motor 710 at one side and the electronic valve 730 at the other side to cooperate with the motor 710 and the flap valve 720, so the housing body 701 has disadvantages in terms of the manufacture of the ACV 700.

For example, the ACV 700 is manufactured in such a way that the housing body 701 is injection molded by die casting a conventional aluminum material, and holes are formed, and the surface of it is processed, and bearings are engaged in the housing body 701 along with other elements, and a cooling tube is inserted for the sake of the circulation of cooling water.

When the ACV 700 is manufactured, the housing body 701 inevitably becomes heavy because the aluminum is used, and the thermal durability of the ACV 700 becomes lowered due to the thermal expansion of the aluminum material.

In particular, the thermal sensitivity of the ACV 700 might be a cause which brings an abnormal operation when the cooling performance becomes bad, so the ACV 700 might affect the quality and the reliability of the fuel cell vehicle adapting the same.

The ACV 700 is manufactured using an aluminum material, the molding of the housing body 701 is limited to the die casting method, which results in an inconvenient molding, and such inconveniences increases more in the next assembling process following the molding.

For example, it is manufactured in a sequence that an aluminum material is die-cast, and the whole profile of the housing body 701 is injected, and the holes are formed, and surfaces are processed, and then the related elements are assembled, thus finishing a product; however the above mentioned molding and assembling procedures are complicated, which causes the manufactures of the ACV 700 to slow.

The ACV 700 adapting the housing body 701 made from an aluminum material is not good at a rust inhibition for the fuel cell vehicle which is exposed to relatively more moistures.

The above mentioned phenomenon becomes worsened since the ACV 700 closes when the engine stops, and the water produced from the fuel cell stack 200 could not leak to the outside and gathers instead at the side of the ACV 700.

The water at the ACV 700 causes an unstable cold start due to the freezing of moisture under a below-zero external temperature condition. The aluminum might be corroded due to moisture.

The solidification of the flap valve 720 due to the freezing of the moisture of the ACV 700 can be easily melted and resolved using the heater; however the corrosion phenomenon cannot be removed unless moisture is fully eliminated.

When the ACV 700 is more corroded due to the moisture, the water might be leaked to the electronic elements such as the electronic valve 730 controlling the flap valve 720 or the motor, so the ACV 700 might be failed.

SUMMARY OF THE INVENTION

Accordingly, the present invention is made to resolve the problems encountered in the conventional art. It is an object of the present invention to provide an air cutoff valve and a restart stabilization method using the same which can significantly enhance a start stability since a restart state can be quickly obtained in a quick response when restarting an engine in such a way that an open state of a flap valve is maintained even though an engine abnormally stops, which is opposite to a normal engine stop that a driver normally intended in a normal engine key-on state.

It is another object of the present invention to provide an air cutoff valve and a restart stabilization method using the same which can prevent a molding and assembling process from increasing and a unit cost from rising with the aid of a weight increase prevention and a die casting injection by making a housing body with a plastic material as compared to a conventional art in which an aluminum material is used, and in particular an engine failure occurring due to the corrosion owing to gathered moistures can be prevented.

It is further another object of the present invention to provide an air cutoff valve and a restart stabilization method using the same which makes it possible to prevent a start failure which occurs due to the freezing of moisture at a below-zero temperature in winter in such a way that the solidification due to the freezing of moisture at the flap valve engaged to a plastic material housing body and opened and closed by the motor is resolved.

To achieve the above objects, there is provided an air cutoff valve comprising a plastic housing unit in which a metallic material is added on an air passage; a flap valve opening and closing the air passage; a motor which is driven by way of a controller when an engine starts and generates a rotational force so as to open the flap valve; an electronic decelerator which converts the flap valve from a full close state to a full open state by receiving a rotational driving force of the motor and maintains a full open state of the flap valve without driving the motor so that an air can be supplied by way of the air passage when the engine stops normally by the driver or when the engine stops abnormally; and a return unit which returns the flap valve to a full close state by means of an elastic recovery force in a state that there is not a motor's driving when the engine stops normally by the driver.

The housing unit comprises a housing body in which a pair of metallic bearings provided at both sides of the air passage are molded and formed together with a metallic bore which is added on the air passage; a motor body which is integrally formed at one side portion of the housing body and accommodates the motor; and a gear body which is integrally formed at another side portion of the housing body and accommodates the electronic decelerator.

The electronic decelerator comprises a gear unit which rotates the flap valve by decelerating a rotational force of the motor and increasing the torque and forms an elastic recovery force which is applied to the return unit when the flap vale is converted into a full open state; a sensing unit which generates a full close signal and a full open signal of the flap valve upon a rotation position change of the gear unit and transmits them to the controller; and a holding unit which operates by way of the controller which recognizes the full open state of the flap valve and fixes the full open state of the flap valve and releases the fixing of the full open state of the flap valve as it operates by way of the controller which recognizes the engine stop by the driver.

The gear unit comprises a spur gear rotating by means of the motor; a deceleration gear which decelerates the rotation of the spur gear and increases the torque; an inter gear which is engaged to the gear shaft of the deceleration gear; and a shaft gear which is engaged with the inter gear and decreases the rotations and increases the torque, and opens and closes the flap valve in the engaged state.

The shaft gear elastically deforms a torsion spring belonging to the return unit when it rotates so as to open the flap valve, and the elastic return force applied from the torsion spring is continuously applied to the shaft gear.

The spur gear, the deceleration gear engaged with the spur gear and the shaft gear engaged with the inter gear of the deceleration gear are arranged on a straight line.

The sensing unit comprises a magnet which changes its position upon a rotation position change of the gear unit; and a hall sensor which detects the position change of the magnet at two different positions and generates a detection signal transmitted to the controller.

The hall sensor comprises a first hall sensor which is mounted on a circuit substrate having a circuit transmitting signals to and receiving them from the controller and detects one position of the magnet; and a second hall sensor which is mounted on the circuit substrate at an interval from the first hall sensor and detects another position upon the position change of the magnet.

The first hall sensor and the second hall sensor have an interval of 90° in max, and the detection signal of the first hall sensor corresponds to the full open position of the flap valve, and the detection signal of the second hall sensor corresponds to the full close position of the flap valve.

The holding unit comprises a solenoid which compresses an inner return spring by pulling the rod when an electric power is conducted and pushes the rod with the aid of an elastic recovery force of the return spring when the electric power is disconnected; a ratchet having a rotation center which rotates in the counterclockwise direction when the rod moves inward and rotates in the clockwise direction when the rod moves outward; and a ratchet protrusion which is spaced apart when the ratchet rotates in the counterclockwise direction and holds the gear unit as it is engaged when the ratchet rotates in the clockwise direction.

The gear unit comprises a spur gear rotating by means of the motor; a deceleration gear decelerating the rotation of the spur gear and increasing the torque; an inter gear which is engaged to the gear shaft of the deceleration gear; and a shaft gear which is engaged with the inter gear and decreases the rotations and increases the torque and opens and closes the flap valve, and the ratchet protrusion is integrally formed at the shaft gear.

The controller further comprises a control of the heat which generates heat for the sake of solidification due to the freezing of moisture oat the flap valve, and the heater is configured to heat a metallic portion added on the air passage.

To achieve the above objects, there is provided an air cutoff valve comprising a plastic housing unit in which a metallic material is added on an air passage opened and closed by a flap valve; a motor which generates a rotational force so as to open the flap valve when an engine starts by a driver; a gear unit including a spur gear rotating by means of the motor; a deceleration gear which decelerates the rotation of the spur gear and increases the torque; an inter gear which is engaged to the gear shaft of the deceleration gear and decreases the torque and increases the rotations; and a shaft gear which is engaged with the inter gear and rotates, and opens and closes the flap valve in the engaged state; and a sensing unit which detects the position changes of the magnet fixed at the shaft gear at two different positions and uses the detection signal of one position as a full close position of the flap valve and uses the detection signal of the other position as a full open position of the flap valve; a holding unit including a solenoid which has a rod moving inward while compressing a return spring in the interior as an electric power is supplied and moving outward by an elastic recovery force of the return spring as the electric power is disconnected; and a ratchet which rotates in the counterclockwise direction when the rod moves inward and is spaced apart from a ratchet protrusion formed at the shaft gear and rotates in the clockwise direction when the rod moves outward and is engaged with the ratchet protrusion for thereby holding the shaft gear; a torsion spring which returns the flap valve to the full close state by applying an elastic recovery force to the shaft gear in a state that there is not a driving of the motor when an engine stops by a diver; a heater which generates heat when solidification occurs by means of the freezing of moisture at the flap valve and heats a metallic material portion added on the air passage; and a controller which maintains the full open state of the flap valve by converting the flap valve to the full open state by driving the motor when the engine starts by the driver and by converting the solenoid from the on state to the off state, and converts the solenoid from the on state to the off state without driving the motor when the engine stops by the driver, and starts the engine without driving the motor and the solenoid when the engine stops abnormally irrespective of the driver's intention, and supplies an electric power to the heater under an external temperature condition causing the freezing of moisture.

To achieve the above objects, there is provided a restart stabilization method using an air cutoff valve, comprising a freezing melting step for melting the freezing state of a flap valve, which opens and closes an air passage, by driving a heater when an external temperature is below zero when an engine starts; a flap valve open position opening step for driving the motor after the solenoid is turned on so as to rotate the ratchet in the counterclockwise direction by means of the rod which moves inward and for opening the flap valve engaged to it by way of the rotations of the shaft gear which receives the driving force of the motor after the rotation deceleration and toque increase procedures; a flap valve open maintaining step for inhibiting the closing intention of the flap valve by engaging the ratchet with the shaft gear, the ratchet rotating in the clockwise direction by way of the rod which moves outward as the solenoid turns off after the flap valve become the full open state; a restart implementation step for performing an engine start without driving the motor and the solenoid when the engine restarts by the driver after the engine stops abnormally which is different from the normal engine stop by the driver during the driving; and a flap valve management step when the engine stops, in which the solenoid is turned on so as to release the holing with respect to the shaft gear as the ratchet rotates in the counterclockwise direction by way of the rod which moves inward, without driving the motor when the engine stops by the driver, and the solenoid is turned off after the flap valve returns to the full close state by means of an elastic recovery force of the torsion spring which was elastically deformed when the flap valve was fully open, and the full open state of the flap valve is maintained when the engine restarts without driving the motor and the solenoid.

In the flap valve open maintaining step, the driving of the motor in the flap valve open maintaining step lasts for one second, and the full open state of the flap valve, in which the solenoid is turned off, is set based on the detection signal of a second hall sensor fixed at the full close position of the flap valve and responding to a magnetic force of the magnet and is judged by the detection signal of the first hall sensor which is fixed at the full open position of the flap valve and responses to the magnetic force of the moved magnet.

The detection signal of the first hall sensor and the detection signal of the second hall sensor are continuously, repeatedly detected for 30 seconds, and in the middle of the repeated detection procedure, when a detection signal of the second hall sensor generates, it stops, and the solenoid is turned off.

In the engine stop implementation step, the on time of the solenoid lasts 2 seconds, and the full close state of the flap valve in which the solenoid is turned off is judged by a detection signal of the second hall sensor which is fixed at the full close position of the flap valve and responds to a magnetic force of the magnet.

BRIEF DESCRIPTION OF THE DRAWINGS

FIGS. 7A and 7B are views illustrating an operation state of an electronic decelerator when an air cutoff valve is open according to the present invention.

DESCRIPTION OF SPECIFIC EMBODIMENTS

The preferred embodiments of the present invention will be described with reference to the accompanying drawings. Since the embodiments can be implemented in various forms by an ordinary person skilled in the art, the embodiments are not limited to the following descriptions.

Figure 1:
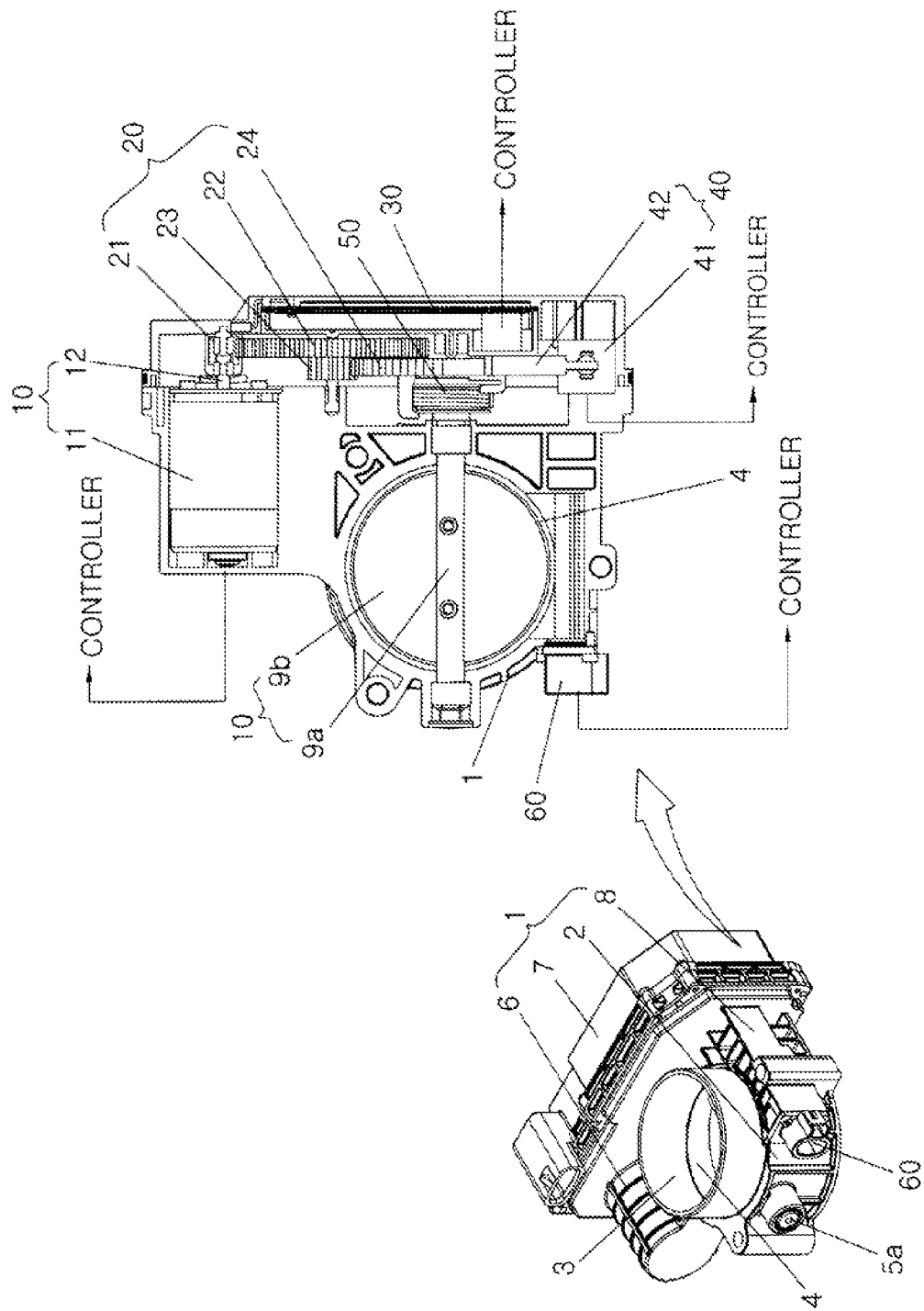
FIG. 1 is a view illustrating a construction of an air cutoff valve according to the present invention.

FIG. 1 is a view illustrating a construction of an air cutoff valve according to the present embodiment of the present invention.

As shown therein, the ACV (Air Cutoff Valve) comprises a housing unit 1 which is molded using a plastic material and forms an open air passage 3, a flap valve 9 installed at the air passage 3 for opening and closing the air passage 3, a driving force unit 10 driven in response to a control of the controller and generating a rotational force, an electronic decelerator which opens and closes the flap valve 9 by decelerating the rotation of the driving force unit 10 and increasing the torque and is controlled by the controller to make sure that the open state of the flap valve 9 is maintained until the key off state, and a heater 60 controlled by the controller so that the solidification of the flap valve 9, which occurs due to the freezing of moisture, can be melted and resolved by generating heat.

The housing unit 1 is made from a plastic material, and the flap valve 9 is formed of a flap body 9b which is engaged to a rotary shaft 9a and rotates together for thereby opening and closing the air passage 3. The driving unit 10 is drive-controlled by a motor drive receiving a signal from the controller and generates a driving force and is formed of a motor 11 having a motor shaft 12.

The electronic decelerator comprises a gear unit 20 opening the flap valve 9 by decelerating the rotational force of the motor 11 and increasing the torque, a sensing unit 30 detecting the position of the flap valve 9 and transmitting to the controller, a holding unit 40 controlled by the controller so as to fix the open state of the flap valve 9 except for the key off based on the driver's intention, and a return unit 50 closing the flap valve 9 with an elastic recovery force during the key off based on the driver's intention.

The electronic decelerator of the present embodiment of the present invention further includes the holding unit 40 to make sure that the restart stability can be significantly enhanced, by which the engine can be quickly restarted after the engine stops during the driving irrespective of the driver's intention.

Here, the restart stability represents a response performance which can quickly response to a driver's restart demand when the engine abnormally stops irrespective of the driver's intention and which is out of the normal situation that the air supply is normally disconnected as the flap valve 9 is closed when the engine stops due to a normal key-off operation that the driver intended, and the air supply is resumed as the flap valve 9 is open when the engine normally starts owing to the normal key-on that the driver intended.

What the restart stability is good represents that the air supply is quickly resumed from the open state of the flap valve 9, by which the performance of the ACV is determined.

As described above, as the holding unit 40 maintains the open state of the flap valve 9, the air supply can be quickly resumed by way of the ACV when the engine restarts.

Figure 2:
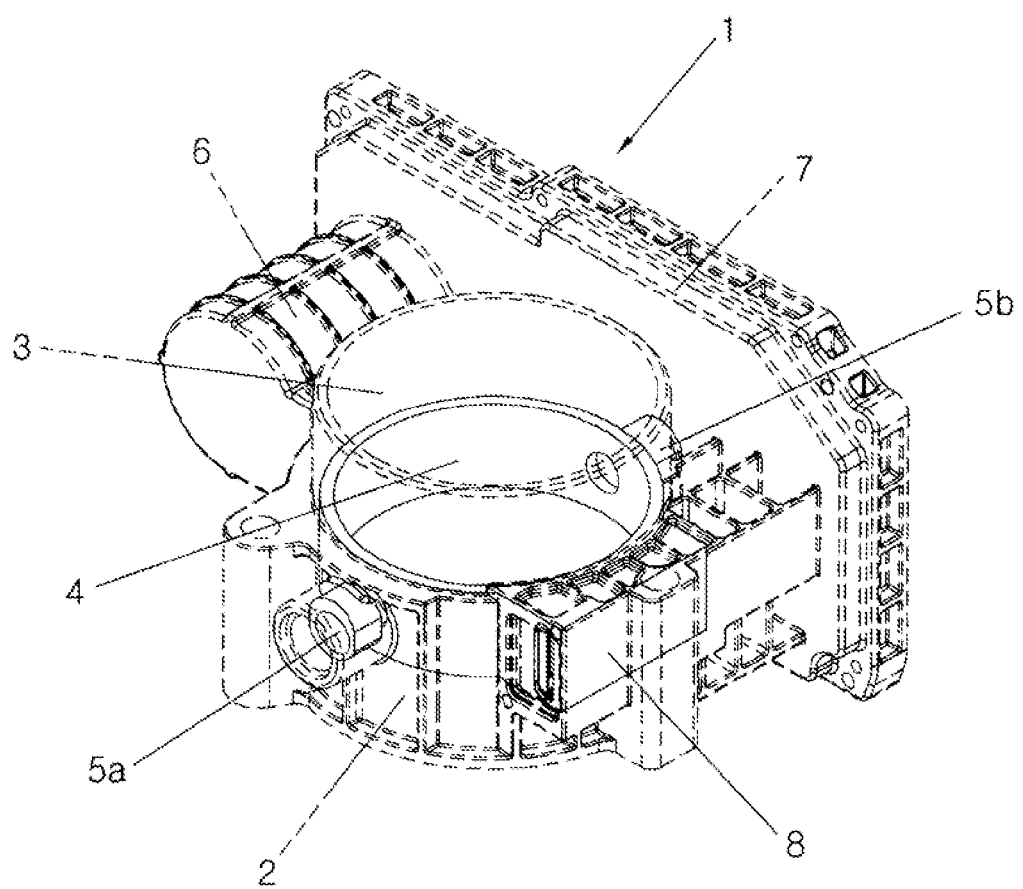
FIG. 2 is a view illustrating a housing body according to the present invention.

FIG. 2 is a view illustrating the housing unit applied to the ACV of the present embodiment.

As shown therein, the housing unit 1 comprises a housing body having an open air passage 3, a bore 4 added on the air passage 3, a pair of bearings 5a and 5b provided at the air passage 3 at 180° opposite positions, a motor body 6 integrated with the housing body 2 at one side portion of the air passage 3, a gear body 7 bent at 90° with respect to the motor body 6 and integrated with the housing body 2, and a heater body 8 integrated with the housing body 2 at the other lateral side of the air passage 3.

The gear body 7 might be integrated with the housing body 2; however it is preferably formed being separate from the housing body 2 in a structure that it is engaged by a screw or a bolt, etc.

The bore 4 and the bearings 5a and 5b are made from metallic materials, and in particular the bore 4 is configured to melt the solidification of the valve flap 9 due to the freezing of moisture as it is heated by the heat from the heater 60.

Here, the bore 4 is made from an aluminum material.

In the present embodiment of the present invention, the housing unit 1 is made from a plastic material, so it is lighter than the weight of the aluminum material, and various advantages can be obtained based on the physical properties of a plastic material.

Since the housing unit 1 is molded thanks to the physical properties of a plastic material, the manufacture process and the assembly process can be more simplified as compared to the die casting method.

For example, as the plastic is used, the metallic bore 4 and the bearings 5a and 5b can be together positioned in the insert mold and then can be together molded when molding the housing unit 1. Thanks to such molding method, the assembling process for pressurizing and inserting the metallic bore 4 and the bearings 5a and 5b is not needed after the housing unit 1 is molded, so the assembling process can be reduced.

Since the housing unit 1 is made from a plastic material having a lower thermal expansion characteristic as compared to aluminum, so it is not sensitive to heat, and the ACV has a relatively higher thermal durability, so the quality and reliability can be significantly enhanced.

Since the housing unit 1 is made from a plastic material, corrosion does not occur as compared to aluminum, and even though moisture gathers, the electronic elements are not corroded, so they can be kept in safe.

Figure 3:
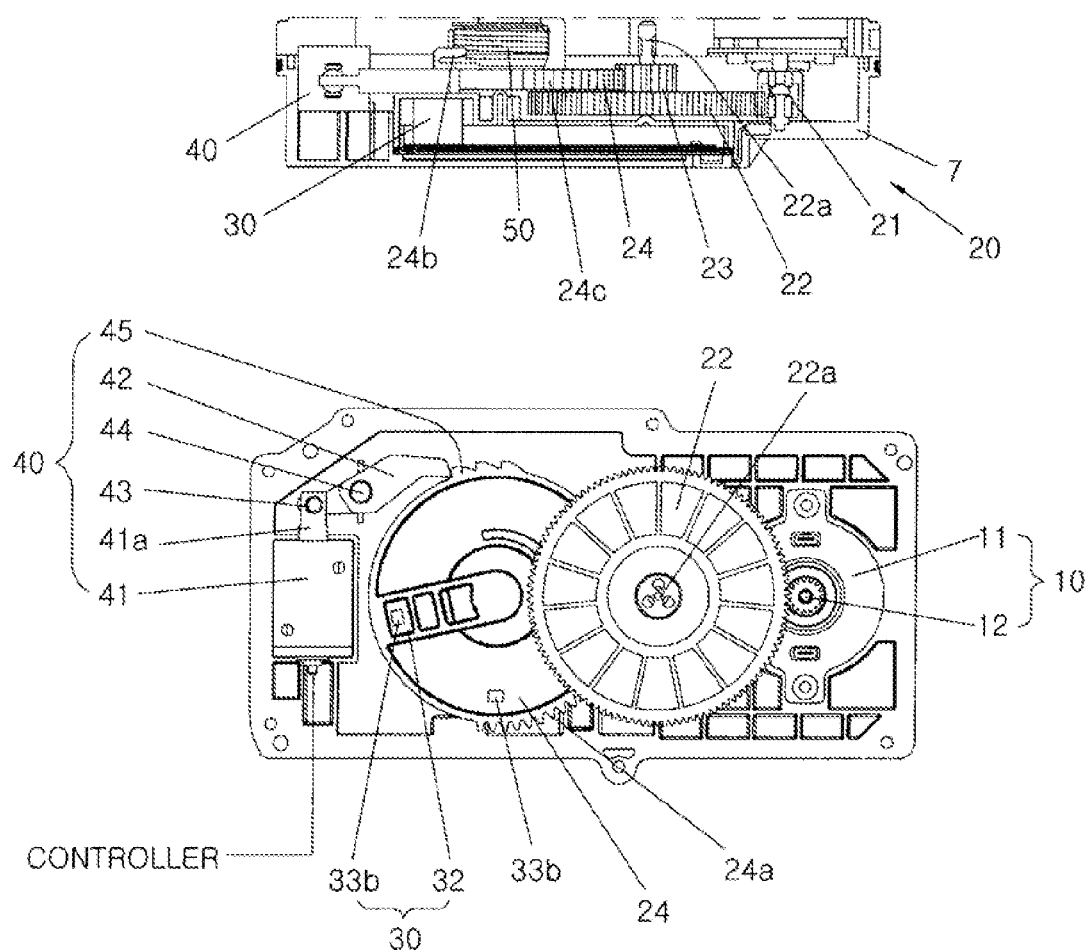
FIGS. 3 and 4 are views illustrating a detailed construction of an electronic decelerator according to the present invention.

FIG. 3 is a view illustrating a gear unit 2, a sensing unit 30, a holding unit 40 and a return unit 50 which belong to the electronic decelerator which is applied to the ACV according to the present embodiment.

As shown therein, the gear unit 20 comprises a spur gear 21 fixed at a motor shaft 12 of the motor 11 and rotating, a deceleration gear 22 decelerating the rotations of the spur gear 21 and increasing the torque, an inter gear 23 engaged to a gear shaft 22a of the deceleration gear 22, and a shaft gear 24 engaged with the inter gear 23 and decreasing the rotations and increasing the torque for thereby opening and closing the flap valve 9.

The number of the teeth of the deceleration gear 22 as compared to the spur gear 21 and the number of the teeth of the shaft gear 24 as compared to the inter gear 23 are determined at a ratio depending on the opening specification of the flap valve 9.

The teeth 24a of the shaft gear 24 are formed only at a certain portion of the whole rims and are set depending on the open angle [full close→full open] of the flap valve 9.

In addition, the shaft gear 24 has a specific section where the ratchet protrusion 45 is out of the teeth 24a of the shaft gear 24. The ratchet protrusion 45 operates in cooperation with the holding unit 40 so that the opening angle of the flap valve 9 can be stably maintained.

A shaft boss 24d protruded from one lateral side is formed at the center of the shaft gear 24 and is engaged with the rotary shaft 9a of the flap valve 9. Spring bosses 24b and 24c are formed around the shaft boss 24d, thus defining the assembling position of the return unit 50.

In the present embodiment, the spur gear 21, the deceleration gear 22 engaged to the spur gear 21 and the shaft gear 24 engaged to the inter gear 23 of the deceleration gear 22 are aligned on a straight line.

The sensing unit 30 comprises a circuit substrate 31 having a circuit amplifying an electric signal and converting it and transmitting to the controller, a magnet 32 the position of which changes depending on the change in the opening angle of the flap valve 9, and at least one hall sensor 33 generating an electric signal by detecting a change in the position of the magnet 32.

The circuit substrate 31 is assembled to the gear body 7 of the housing unit 1.

The magnet 32 is a permanent magnet and is attached to the shaft gear 24 of the gear unit 20, thus generating a change in the position depending on the rotation of the shaft gear 24.

The hall sensor 33 is formed of a first hall sensor 33a and a second hall sensor 33b on the circuit substrate 31 at a certain interval between them. When detecting the magnet 32 which is positioned at a certain portion, a detection signal from the first hall sensor 33a is used to judge the full open of the ACV, and when detecting the magnet 32 which is positioned at the changed portion, a detection signal from the second hall sensor 33b is used to judge the full close of the ACV.

The interval between the first hall sensor 33a and the second hall sensor 33b is 90° in max, and the reference value is set as 0° when the flap valve 9 is in the full close state, and when the flap valve 9 is in the full open state, it is set as 90° from the above reference value.

The detection signals from the first hall sensor 33a and the second hall sensor 33b are inputted into the controller which operates the holding unit 40 or can be directly inputted as a control signal for driving the holding unit 40.

The holding unit 40 comprises a solenoid 41 having a rod 41a with a stroke which moves inward or outward, a ratchet 42 which rotates in a clockwise direction (when the rod moves inward) and in a counterclockwise direction (when the rod moves outward) about the rotation center in cooperation with the motions of the rod 41a of the solenoid 41, and a ratchet protrusion 45 which is engaged to or disengaged from the ratchet 42 depending on the rotation direction of the ratchet 42.

When the solenoid 41 is on, the rod 41a is pulled, so it moves into the solenoid 41, and when the solenoid 41 is off, the rod 41a is pushed, so it disengages.

For the sake of the above operations, the solenoid 41 has a return spring which elastically supports the rod 41a and is compressed and deformed by the rod 41 which is pulled, and the return spring pushes the rod with the elastic return force when the pulling of the rod 41a stops.

One portion of the ratchet 42 is fixed at the rod 41a of the solenoid 41 about a hinge pin 43, and its intermediate portion is fixed about the other hinge pin 44, and as the other portion is free to move, the seesaw motions can be implemented about the other hinge pin 44.

The other side portion of the ratchet 42 in a free state is engaged with the ratchet protrusion 45, thus holding the shaft gear 24 having the ratchet protrusion 45.

The ratchet protrusion 45 is formed at the shaft gear 24 of the gear unit 20, and as described earlier, it is formed of at least one protrusion in a section formed out of the teeth 24a of the shaft gear 24.

Figure 4:
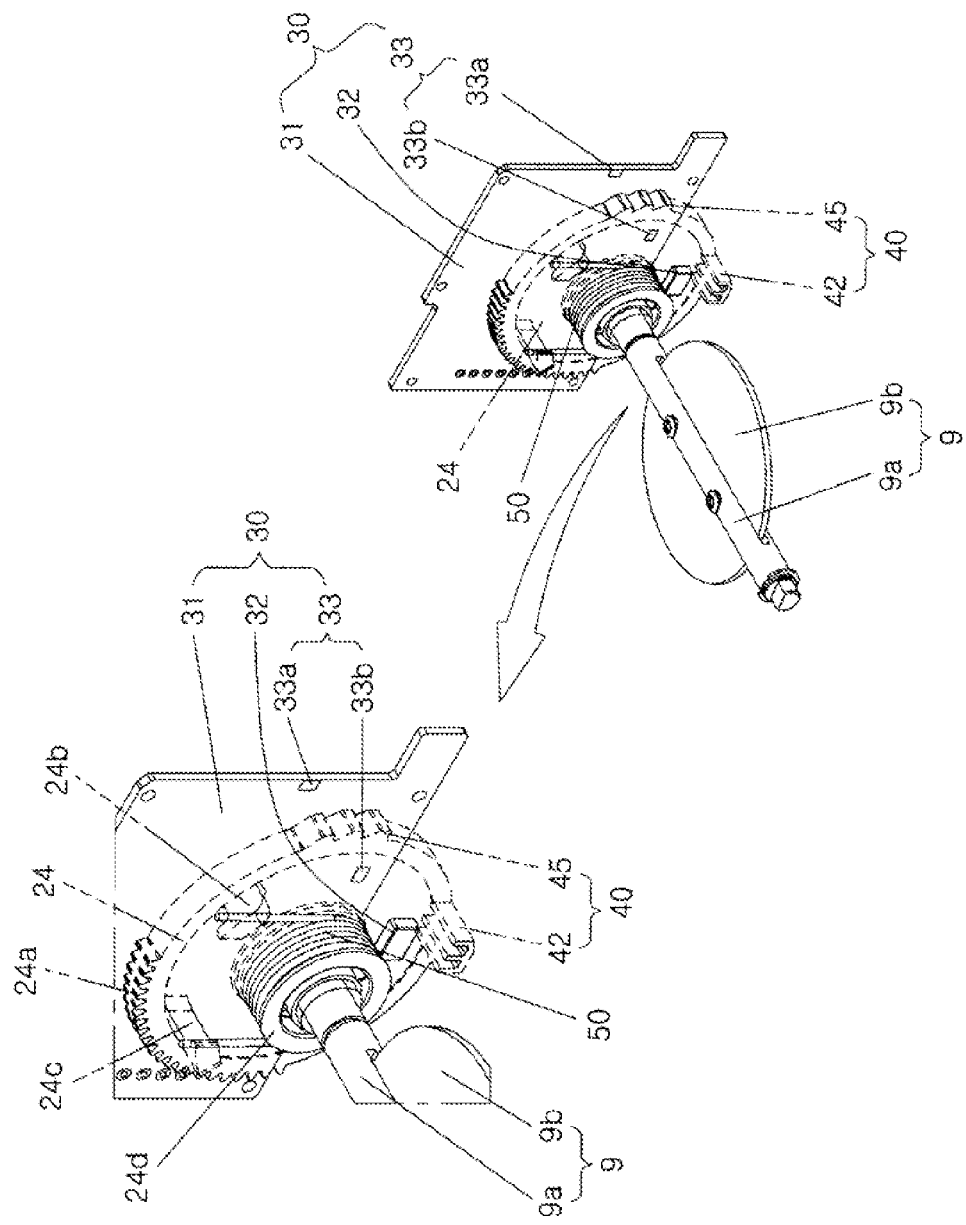

FIG. 4 is a view illustrating a construction of the flap valve 9, the shaft gear 24, the hall sensor 33 and the return unit 50.

As shown therein, the shaft gear 24 has a shaft boss 24d which is protruded from its center and is engaged with the rotary shaft 9a of the flap valve 9, thus directly generating the motions of the flap valve 9.

The hall sensor 33 is configured in such a way that the first hall sensor 33a and the second hall sensor 33b are mounted on the circuit substrate 31 at a certain interval between them. The first hall sensor 33a detects a specific position of the magnet 32 fixed at the shaft gear 24, and the second hall sensor 33b detects another specific position of the magnet 32 moved depending on the rotation of the shaft gear 24.

The return unit 50 is mounted as if to wind on the rotary shaft 9a of the flap valve 9 engaged to the shaft boss 24d of the shaft gear 24, and both sides where it is not wound are held by a pair of the spring bosses 24b and 24c formed around the shaft boss 24d.

The return unit 50 is a torsion spring type, the modulus of elasticity of which is determined in consideration of the torque moving the flap valve 9.

The controller according to the present invention represents a controller comprehensively controlling the operations of the fuel cell vehicle and has a function of generating a control signal with respect to the ACV and supplying a battery power. The controller also controls the heater for the purpose of melting the freezing of moisture and has a control logic for the sake of a restart stabilization by way of a control of the ACV.

As the control logic contains a heater control, it is possible to resolve the solidification of the ACV due to the freezing of moisture when it is below zero, thus significantly enhancing the start stability of the fuel cell vehicle.

In particular, there is further provided a control logic for the purpose of enhancing the restart stability, by which it is possible to maintain the open state of the ACV so as to have a quick start state even though the engine stops by an abnormal operation which is opposite to the normal engine stop that a driver intended in a normal engine open state that the driver has indented. Thanks to the above mentioned features, the fuel cell vehicle can have a quick restart response in the fuel cell vehicle, and the restart stability can be significantly enhanced.

Figure 5:
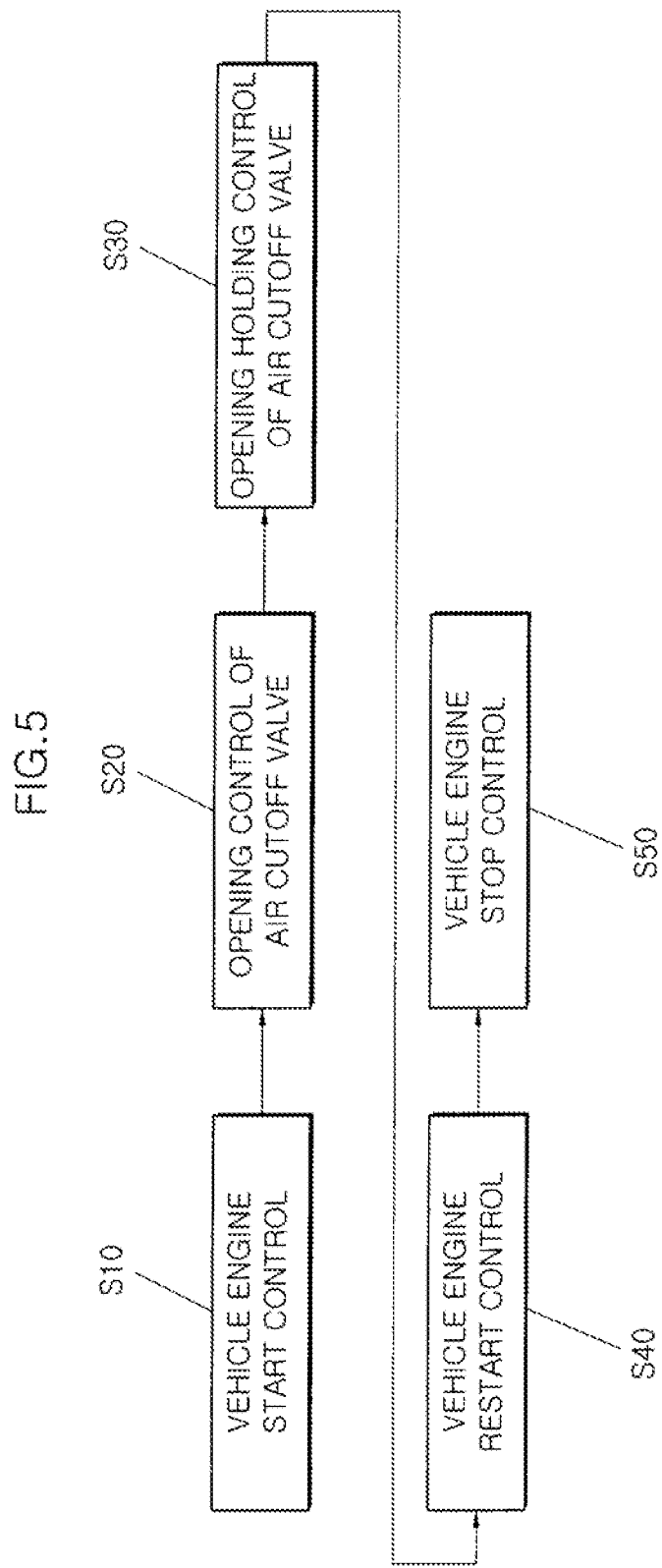
FIG. 5 is a control block diagram of an air cutoff valve and a restart stabilization method using the same according to the present invention.

FIG. 5 is a control block diagram of an air cutoff valve when an engine starts according to the present embodiment. The control block comprises a vehicle engine start control S10, an opening control S20 of the air cutoff valve, an opening holding control S30 of an air cutoff valve, a vehicle engine restart control S40 and a vehicle engine stop control S50, the operations of which are performed in sequence.

When the vehicle engine start control S10 is executed, it is checked whether the thawing of the ACV is requested when the fuel cell vehicle is in the engine start state (ON).

Figure 6:
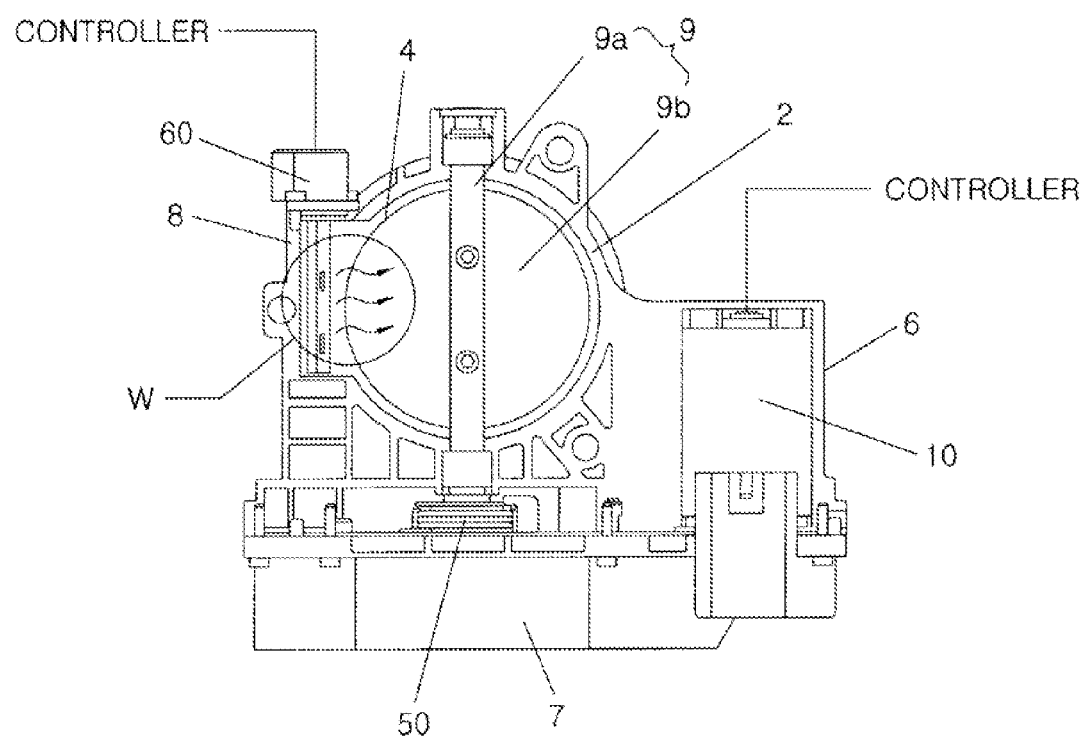
FIG. 6 is a view illustrating an operation state of a heater according to the present invention.

The requiring condition with respect to the thawing of the ACV is judged at a below-zero external temperature, and as the heater 60 is driven when the requiring condition is satisfied, the freezing can be thawed by the heat W with respect to the portion of the bore 4 of a metallic material as shown in FIG. 6.

So, even though the flap valve 9 is solidified due to the freezing of moisture at a below-zero temperature in winter, it is possible to prevent that the engine does not start due to the failure in the ACV.

The opening control S20 of the air cutoff valve is performed, thus opening the ACV, after the heater 60 is not driven or is driven, and continuously the holding control S30 of the air cutoff valve is performed, and the ACV is open until the full open, and the open state is maintained.

As the opening holding control S30 of the air cutoff valve is performed, the ACV according to the present embodiment quickly starts supplying the air when the engine restarts after the abnormal engine stop, so the restart response of the fuel cell vehicle is quick, and the start safety can be enhanced.

Figure 7B:
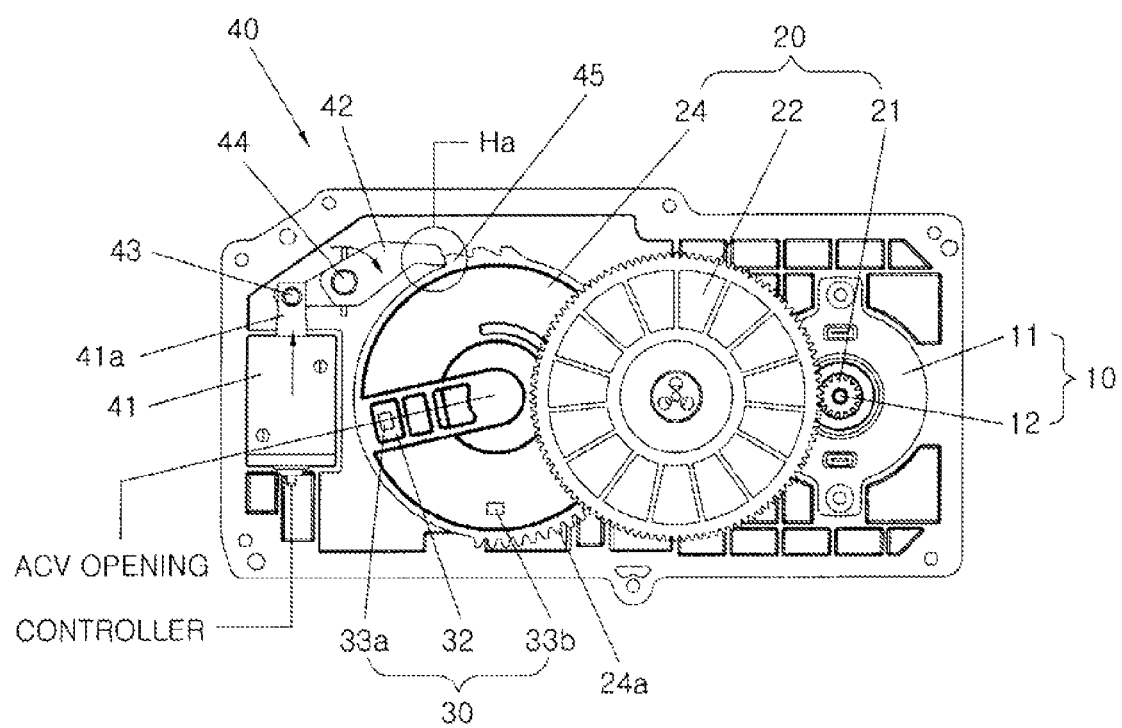

FIGS. 7A and 7B are views illustrating the full open operation of the ACV after the detailed logics based on the opening holding control S30 of the air cutoff valve following the opening control S20 of the air cutoff valve are performed.

In case of the opening control S20 of the air cutoff valve, the holding unit 40 is first operated so as to prevent the operation of the gear unit 20 driving the flap valve 9 before the motor 11 is driven, from interfering with the ratchet 42.

During the operations, the solenoid 41 of the present embodiment features in that the rod 41 moves outward with the aid of the inner return spring when there is not power supply, so the ratchet 42 moves down to the shaft gear 24.

FIG. 7A is a view illustrating the operation state of the holding unit 40. As shown therein, as an electric power is supplied, the solenoid 41 is powered on and pulls out the rod 41a and the thusly pulled rod 41a causes the ratchet 42 engaged about the hinge pin 43 to lower, so the ratchet 42 rotates in the counterclockwise direction about another hinge pin 44 as a rotation center.

At this time, the return spring provided at the solenoid is compressed by the rod 41a and stores elastic force. When the solenoid 41 is off, the rod 41a pushes and causes the ratchet 42 to rotate in the clockwise direction while receiving force.

As the free end of the ratchet 42 grows farther from the haft gear 24 of the gear unit 20, the shaft gear 24 changes to a free state from the ratchet 42.

In a state that the shaft gear 24 is free from the ratchet 42, the flap valve 9 is open by driving the motor 11, the operation of which maintains for about one second, and the one second duration time can be set different depending on the ACV design specification.

The opening procedure of the flap valve 9 will be described with reference to FIG. 7B.

The opening procedure of the flap valve 9 will be described with reference to FIG. 7. The driving force of the motor 11 is transferred to the spur gear 21 fixed at the motor shaft 12, and the rotation of the spur gear 21 is transferred to the inter gear 23 engaged to the gear shaft 22a of the deceleration gear 22 by way of the deceleration gear 22 and is converted into the rotations of the shaft gear 24 by way of the teeth 24a engaged with the inter gear 23.

The rotations of the shaft gear 24 cause the rotary shaft 9a of the flap valve 9 engaged to the shaft boss 24d to rotate.

At this time, the return unit 50 disposed between the flap valve 9 and the shaft gear 24 elastically deforms in a state that it is stuck between the spring bosses 24b and 24c depending on the rotation of the shaft gear 24, thus providing a recovery force to the shaft gear 24 when the flap valve 9 is closed.

Thanks to the elastic recovery force of the return unit 50, the ACV can be converted into the full close without using a driving force after the motor 11 is turned off.

Whether or not the flap valve 9 is fully open after about one second passes since the motor 11 is driven is judged by means of a pair of the first hall sensor 33a and the second hall sensor 33b which are responsive to the magnet 32 forming the sensing unit 30.

In other words, the magnet 32 attached to the shaft gear 24 changes its position upon the rotation of the shaft gear 24, and the position change of the magnet 32 is detected by means of the first hall sensor 33a and the second hall sensor 33b fixed at the circuit substrate 31 at certain intervals, so the full open state of the flap valve 9 is judged.

The position of the magnet 32 detected by means of the first hall sensor 33a is set as the full open state of the flap valve 9 and is set as 90°, and the position of the magnet 32 detected by means of the second hall sensor 33b is set as the full close state of the flap valve 9 and is set as 0°.

When it is before the first gall sensor 33a detects the position of the magnet 32, it represents that the flap valve 9 is not converted into the full open state.

In this case, about 30 seconds are counted until the signal of the first hall sensor 33a is detected. While being counted, whether or not the signal of the first hall sensor 33a is detected is continuously performed as it feedbacks.

At this time the duration time of 30 seconds can be set different depending on the ACV design specification.

When a signal of the first hall sensor 33a is detected or a signal of the first hall sensor 33a is detected by way of the feedback during the counting, it is judged that the flap valve 9 has been converted into the full open state, so the motor 11 and the solenoid 41 are both converted into off states.

The above operations are implemented by way of the opening holding control of the air cutoff valve.

The shaft gear 24 becomes a stop state since it does not receive a rotational force from the motor 11, and at the same time the rod 41a of the solenoid 41 moves outward by receiving a force from the compressed return spring.

The above explained operations are performed when 30 seconds are counted.

FIG. 7B shows the same states, and as shown therein, as the rod 41a of the solenoid 41 moves outward, the ratchet 42 engaged by way of the hinge pin 43 is lifted upward.

The ratchet 42 one side of which was lifted upward is forced to rotate about another hinge pin 44 which is a rotation center, and the free end portion of the opposite side is moved down and is held by the ratchet protrusion 45 of the shaft gear 24, and finally the shaft gear 24 is converted into the held state (Ha) by way of the ratchet 42 held by the ratchet protrusion 45.

So, the shaft gear 24 can prevent a rotational motion of the flap valve 9 from converting into the close state from the full open state with the aid of the ratchet 42 held by the ratchet protrusion 45, and in particular it is possible to prevent the elastic recovery force of the return unit 50, which force is applied to the shaft gear 24.

Even though the engine stops under an abnormal situation that a driver did not intend during the driving, the flap valve 9 maintains the full open state, so a quick start is possible when the engine is restarted.

After the flap valve 9 was in the full open state, and at the same time the full open state maintained, it is judged whether there is an abnormal engine stop situation that the driver did not intend during the driving.

Thanks to the above explained operations, if the engine stop is normal, not abnormal engine stop, as a result of the judgment, the routine goes to the vehicle engine stop control S50; however as a result of the judgment, if it is an abnormal engine stop situation, the routine goes to the vehicle engine restart control S40, and it is judged whether there is an engine restart request from the driver.

If there is not an engine restart request from the driver, the routine goes to the vehicle engine stop control S50, and if there is an engine restart request from the driver, the routine goes to the vehicle restart control S40, so the vehicle quickly becomes the engine restart state.

The above mentioned driver's engine restart request is quickly transferred, so the vehicle quickly becomes the engine restart state, all the operations of which can be made possible thanks to the ACV which maintains the full open state.

In other words, even though the engine stops, the ACV maintains the full open state, and as mentioned above, the ratchet 42 causing the shaft gear 24 to be in a holding state operates in the off state of the solenoid 41, and the off state of the solenoid 41 can be maintained when there is a key off state that the driver indented or there is an abnormal engine stop situation that the driver did not intend.

In the present embodiment, as the ACV always maintains the full open state, when the engine restarts when the engine abnormally stopped irrespective of the user's intention, the ACV which maintains the full open state can quickly start the air supply and can quickly response to the driver's engine restart request, so the quick engine restart can be obtained.

When the routine goes to the vehicle engine stop control S50 as the engine stop (key off) that the driver intended is detected, the ACV performs a control for the sake of the full close.

In this case, the ACV can be converted into the full close state without using the driving force of the motor 11 which is another feature of the present embodiment, the operations of which can be made possible since the flap valve 9 is closed as the return unit 50 that was elastically deformed when the ACV was converted into the full open state provides a recovery force to the shaft gear 24.

Figure 8A:
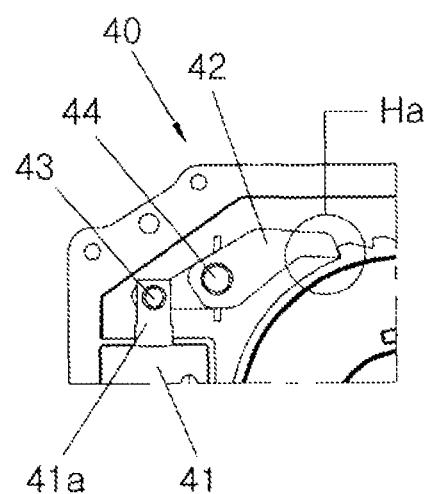
FIGS. 8A and 8B are views illustrating an operation state of an electronic decelerator when an air cutoff valve is closed according to the present invention.
Figure 8B:
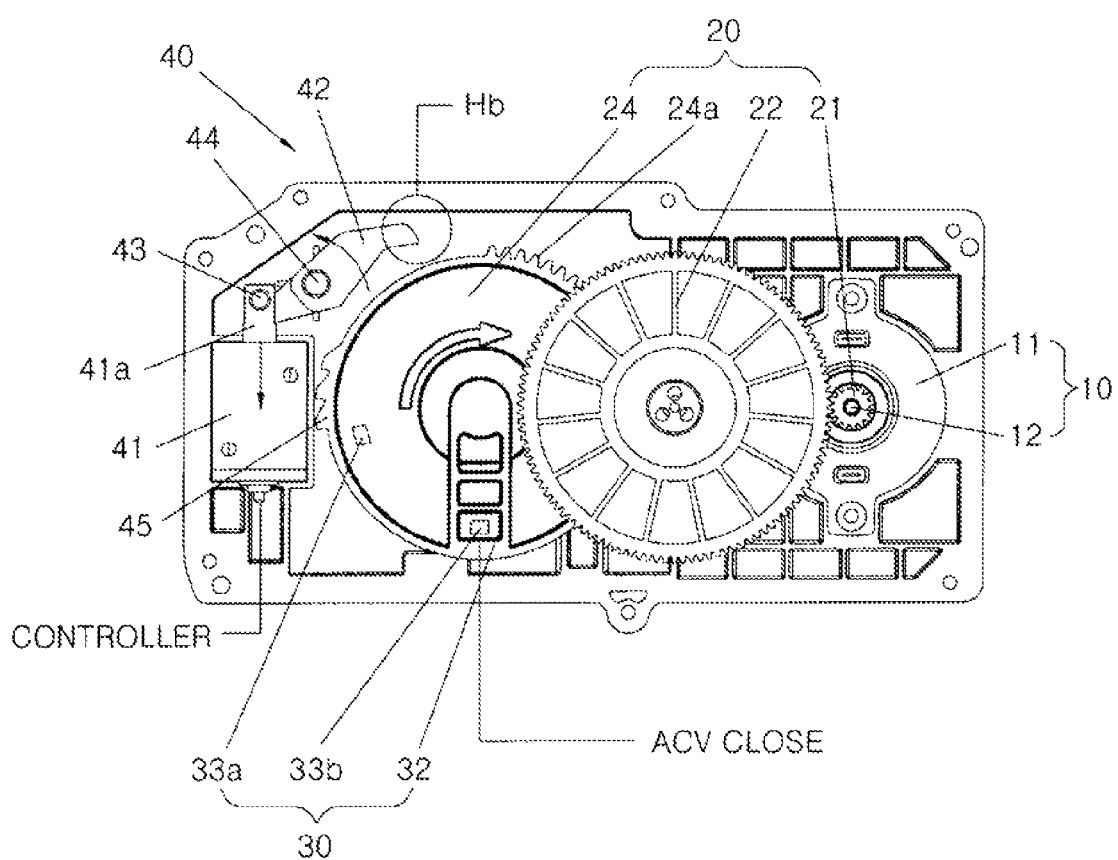
Figure 9:
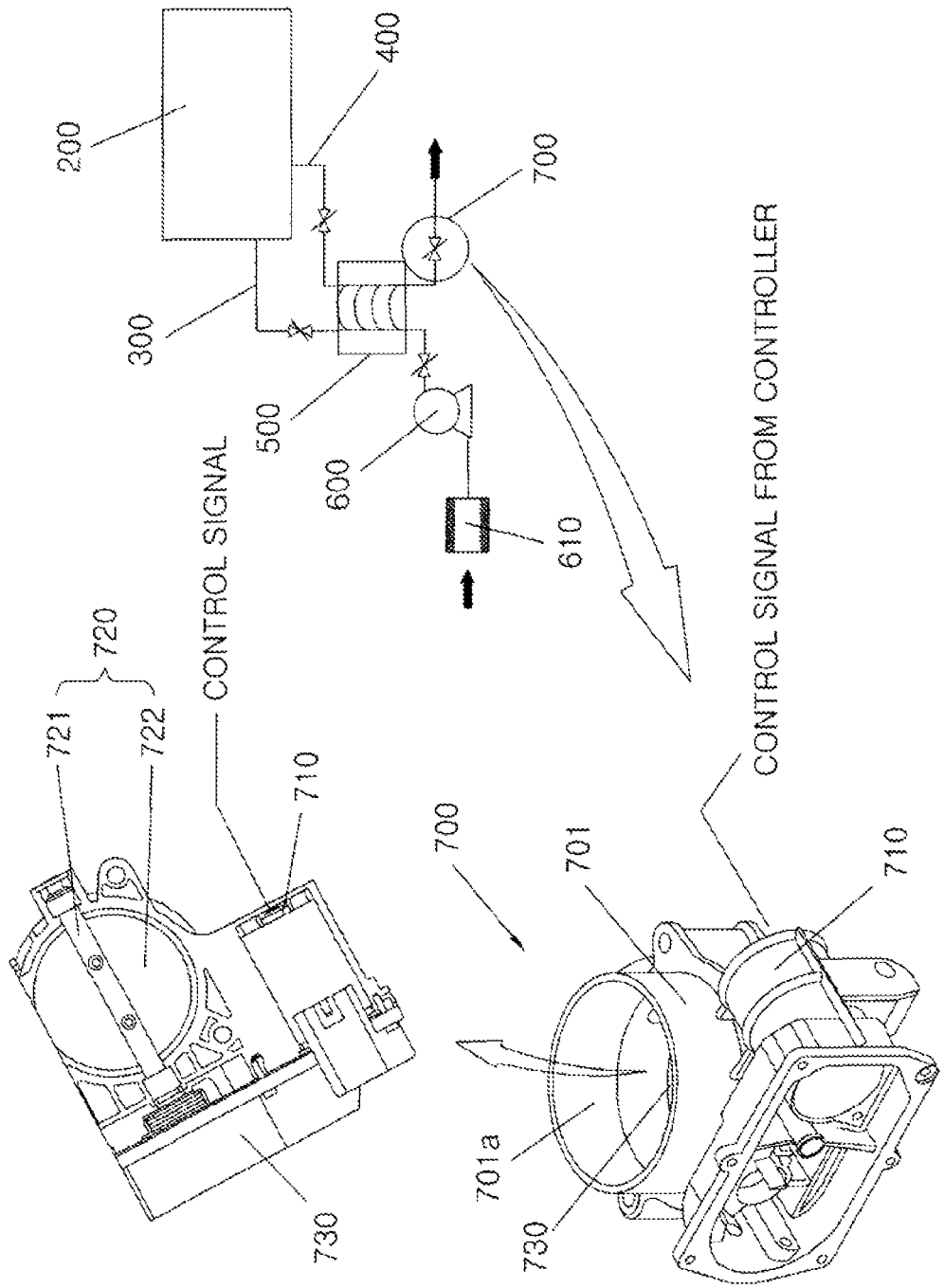
FIG. 9 is a view illustrating an air system line for a conventional fuel cell vehicle.

FIGS. 8A and 8B are views illustrating the full close operation procedures of the ACV thanks to the detailed logic owing to the vehicle engine stop control S50.

The vehicle engine stop control S50 is directed to a procedure that the shaft gear 24 keeping the holding state by means of the ratchet 42 in the full open state is first released, for which the solenoid 41 is converted into the on state as an electric power is supplied, and the motor 11 maintains the off state.

The solenoid 41, which was converted into the on state, pulls the rod 41a, so the ratchet 42 engaged by way of the hinge pin 43 lowers, and the ratchet 42 rotates in the counterclockwise direction about another hinge pin 44.

At this time, the return spring provided at the solenoid 41 is compressed by the rod 41a and comes to store an elastic force, and when the solenoid 41 becomes an off state, the rod 41a can receive a force causing the ratchet 42 to rotate in the clockwise direction.

As the free end of the ratchet 42 becomes farther from the shaft gear 24 of the gear unit 20, as shown in FIG. 8B, the shaft gear 24 is converted into the free state (Hb) from the ratchet 42.

At this time, a power conduction time of the solenoid 41 is needed until the free end of the ratchet 42 is converted into the free state (Hb) from the shaft gear 24. It lasts for about 2 seconds; however it can be set different depending on the ACV design specification.

After the free end of the ratchet 42 is converted into the free state (Hb) from the shaft gear 24, the shaft gear 24 rotates by means of the elastic recovery force itself of the returning return unit 50 without using the motor 11, and the flap valve 9 can be converted into the full close state.

As shown in FIG. 8B, with the aid of the shaft gear 24 rotating by receiving an elastic recovery force of the return unit 50, the magnet 32 moves from the first sensor 33a detecting the full open position to the second sensor 33b detecting the full close position.

As the position of the magnet 32 is detected by means of the second sensor 33b, the ACV becomes the off state in which the flap valve 9 is converted into the full close state, the operations of which are implemented identically during the control logic operation under any situations.

When the flap valve 9 is converted into the full close state by the above mentioned method, the engine of the vehicle stops, and the ACV returns to the initial state and maintains the standby state until the engine restarts. When the engine starts, the ACV sequentially controls the vehicle engine star control S10, the opening control S20 of the air cutoff valve, the opening holding control S30 of the air cutoff valve, the vehicle engine restart control S40 and the vehicle engine stop control S50.

The air cutoff valve (Air Cutoff Valve) of the present embodiment maintains a full open state of the flap valve 9 using the ratchet 42 which operates in response to the on and off of the solenoid 41, so the engine restart performance is significantly enhanced with the aid of the quick air supply of the ACV when the engine stops abnormally irrespective of the driver's intention. In addition, the ACV is made from a plastic material, the assembling process can be simplified during the molding formation, so the unit cost for manufactures is reduced, and the corrosion phenomenon due to moisture can be prevented, and the operation reliability can be greatly enhanced.

The air cutoff valve according to the present invention makes it possible to significantly enhance a restart stability in a quick response while quickly reacting when an engine is restarted in such a way that an open state of a flap valve is maintained even though an abnormal engine stop occurs, which is opposite to a normal engine stop that a driver intended in a normal operation state of a vehicle.

In addition, the present invention makes it possible to significantly enhance the quality of a product while eliminating a driver's worry because a vehicle can quickly move in response to an engine restart along with a quick operation of an air cutoff valve.

The air cutoff valve of the present invention adapts a housing body which is made from a moldable plastic material and accommodates electronic elements and a flap valve, etc., so the total weight decreases as compared to an aluminum material, and the molding performance can be enhanced thanks to the natures of a plastic material, so the molding processes and the assembling processes are decreased, and the manufacture unit cost is lowered.

The air cutoff valve of the present invention adapts a plastic material housing body which accommodates electronic elements and a flap valve, etc., so the failure due to corrosion can be perfectly prevented.

The air cutoff valve of the present invention is equipped with a heater for melting the frozen state when an external temperature is below zero, so the failure of an engine start due to the freezing of moisture can be prevented.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An air cutoff valve comprising:
  a plastic housing unit in which a metallic material is added on an air passage;
  a flap valve opening and closing the air passage;
  a motor which is driven by way of a controller when an engine starts and generates a rotational force so as to open the flap valve;
  an electronic decelerator which converts the flap valve from a full close state to a full open state by receiving a rotational driving force of the motor and maintains a full open state of the flap valve without driving the motor so that an air can be supplied by way of the air passage when the engine stops normally by the driver or when the engine stops abnormally; and
  a return unit which returns the flap valve to a full close state by means of an elastic recovery force in a state that there is not a motor's driving when the engine stops normally by the driver.

2. The air cutoff valve of claim 1, wherein the housing unit comprises:
  a housing body in which a pair of metallic bearings provided at both sides of the air passage are molded and formed together with a metallic bore which is added on the air passage;
  a motor body which is integrally formed at one side portion of the housing body and accommodates the motor; and
  a gear body which is integrally formed at another side portion of the housing body and accommodates the electronic decelerator.

3. The air cutoff valve of claim 1, wherein the electronic decelerator comprises:
  a gear unit which rotates the flap valve by decelerating a rotational force of the motor and increasing the torque and forms an elastic recovery force which is applied to the return unit when the flap vale is converted into a full open state;

a sensing unit which generates a full close signal and a full open signal of the flap valve upon a rotation position change of the gear unit and transmits them to the controller; and a holding unit which operates by way of the controller which recognizes the full open state of the flap valve and fixes the full open state of the flap valve and releases the fixing of the full open state of the flap valve as it operates by way of the controller which recognizes the engine stop by the driver.

4. The air cutoff valve of claim 3, wherein the gear unit comprises:

a spur gear rotating by means of the motor;

a deceleration gear which decelerates the rotation of the spur gear and increases the torque;

an inter gear which is engaged to the gear shaft of the deceleration gear; and a shaft gear which is engaged with the inter gear and decreases the rotations and increases the torque, and opens and closes the flap valve in the engaged state.

5. The air cutoff valve of claim 4, wherein the shaft gear elastically deforms a torsion spring belonging to the return unit when it rotates so as to open the flap valve, and the elastic return force applied from the torsion spring is continuously applied to the shaft gear.

6. The air cutoff valve of claim 4, wherein the spur gear, the deceleration gear engaged with the spur gear and the shaft gear engaged with the inter gear of the deceleration gear are arranged on a straight line.

7. The air cutoff valve of claim 3, wherein the sensing unit comprises:

a magnet which changes its position upon a rotation position change of the gear unit; and a hall sensor which detects the position change of the magnet at two different positions and generates a detection signal transmitted to the controller.

8. The air cutoff valve of claim 7, wherein the hall sensor comprises:

a first hall sensor which is mounted on a circuit substrate having a circuit transmitting signals to and receiving them from the controller and detects one position of the magnet; and a second hall sensor which is mounted on the circuit substrate at an interval from the first hall sensor and detects another position upon the position change of the magnet.

9. The air cutoff valve of claim 8, wherein the first hall sensor and the second hall sensor have an interval of 90° in max.

10. The air cutoff valve of claim 9, wherein the detection signal of the first hall sensor corresponds to the full open position of the flap valve, and the detection signal of the second hall sensor corresponds to the full close position of the flap valve.

11. The air cutoff valve of claim 3, wherein the holding unit comprises:

a solenoid which compresses an inner return spring by pulling the rod when an electric power is conducted and pushes the rod with the aid of an elastic recovery force of the return spring when the electric power is disconnected;

a ratchet having a rotation center which rotates in the counterclockwise direction when the rod moves inward and rotates in the clockwise direction when the rod moves outward; and a ratchet protrusion which is spaced apart when the ratchet rotates in the counterclockwise direction and holds the gear unit as it is engaged when the ratchet rotates in the clockwise direction.

12. The air cutoff valve of claim 11, wherein the gear unit comprises:

a spur gear rotating by means of the motor;

a deceleration gear decelerating the rotation of the spur gear and increasing the torque;

an inter gear which is engaged to the gear shaft of the deceleration gear; and a shaft gear which is engaged with the inter gear and decreases the rotations and increases the torque and opens and closes the flap valve, and the ratchet protrusion is integrally formed at the shaft gear.

13. The air cutoff valve of claim 1, wherein the controller further comprises a control of the heat which generates heat for the sake of solidification due to the freezing of moisture oat the flap valve, and the heater is configured to heat a metallic portion added on the air passage.

14. An air cutoff valve comprising:

a plastic housing unit in which a metallic material is added on an air passage opened and closed by a flap valve;

a motor which generates a rotational force so as to open the flap valve when an engine starts by a driver;

a gear unit including a spur gear rotating by means of the motor; a deceleration gear which decelerates the rotation of the spur gear and increases the torque; an inter gear which is engaged to the gear shaft of the deceleration gear and decreases the torque and increases the rotations; and a shaft gear which is engaged with the inter gear and rotates, and opens and closes the flap valve in the engaged state; and a sensing unit which detects the position changes of the magnet fixed at the shaft gear at two different positions and uses the detection signal of one position as a full close position of the flap valve and uses the detection signal of the other position as a full open position of the flap valve;

a holding unit including a solenoid which has a rod moving inward while compressing a return spring in the interior as an electric power is supplied and moving outward by an elastic recovery force of the return spring as the electric power is disconnected; and a ratchet which rotates in the counterclockwise direction when the rod moves inward and is spaced apart from a ratchet protrusion formed at the shaft gear and rotates in the clockwise direction when the rod moves outward and is engaged with the ratchet protrusion for thereby holding the shaft gear;

a torsion spring which returns the flap valve to the full close state by applying an elastic recovery force to the shaft gear in a state that there is not a driving of the motor when an engine stops by a diver;

a heater which generates heat when solidification occurs by means of the freezing of moisture at the flap valve and heats a metallic material portion added on the air passage; and a controller which maintains the full open state of the flap valve by converting the flap valve to the full open state by driving the motor when the engine starts by the driver and by converting the solenoid from the on state to the off state, and converts the solenoid from the on state to the off state without driving the motor when the engine stops by the driver, and starts the engine without driving the motor and the solenoid when the engine stops abnormally irrespective of the driver's intention, and supplies an electric power to the heater under an external temperature condition causing the freezing of moisture.

15. A restart stabilization method using an air cutoff valve, comprising:
- a freezing melting step for melting the freezing state of a flap valve, which opens and closes an air passage, by driving a heater when an external temperature is below zero when an engine starts;
- a flap valve open position opening step for driving the motor after the solenoid is turned on so as to rotate the ratchet in the counterclockwise direction by means of the rod which moves inward and for opening the flap valve engaged to it by way of the rotations of the shaft gear which receives the driving force of the motor after the rotation deceleration and toque increase procedures;
- a flap valve open maintaining step for inhibiting the closing intention of the flap valve by engaging the ratchet with the shaft gear, the ratchet rotating in the clockwise direction by way of the rod which moves outward as the solenoid turns off after the flap valve become the full open state;
- a restart implementation step for performing an engine start without driving the motor and the solenoid when the engine restarts by the driver after the engine stops abnormally which is different from the normal engine stop by the driver during the driving; and
- a flap valve management step when the engine stops, in which the solenoid is turned on so as to release the holing with respect to the shaft gear as the ratchet rotates in the counterclockwise direction by way of the rod which moves inward, without driving the motor when the engine stops by the driver, and the solenoid is turned off after the flap valve returns to the full close state by means of an elastic recovery force of the torsion spring which was elastically deformed when the flap valve was fully open, and the full open state of the flap valve is maintained when the engine restarts without driving the motor and the solenoid.

16. The restart stabilization method using an air cutoff valve of claim 15, wherein in the flap valve open maintaining step, the driving of the motor in the flap valve open maintaining step lasts for one second, and the full open state of the flap valve, in which the solenoid is turned off, is set based on the detection signal of a second hall sensor fixed at the full close position of the flap valve and responding to a magnetic force of the magnet and is judged by the detection signal of the first hall sensor which is fixed at the full open position of the flap valve and responses to the magnetic force of the moved magnet.

17. The restart stabilization method using an air cutoff valve of claim 16, wherein the detection signal of the first hall sensor and the detection signal of the second hall sensor are continuously, repeatedly detected for 30 seconds, and in the middle of the repeated detection procedure, when a detection signal of the second hall sensor generates, it stops, and the solenoid is turned off.

18. The restart stabilization method using an air cutoff valve of claim 15, wherein in the engine stop implementation step, the on time of the solenoid lasts 2 seconds, and the full close state of the flap valve in which the solenoid is turned off is judged by a detection signal of the second hall sensor which is fixed at the full close position of the flap valve and responds to a magnetic force of the magnet.

* * * * *